Feb. 7, 1950 V. E. JOHNSON 2,497,001
COMBINATION FURNITURE
Filed Feb. 21, 1946 2 Sheets-Sheet 1
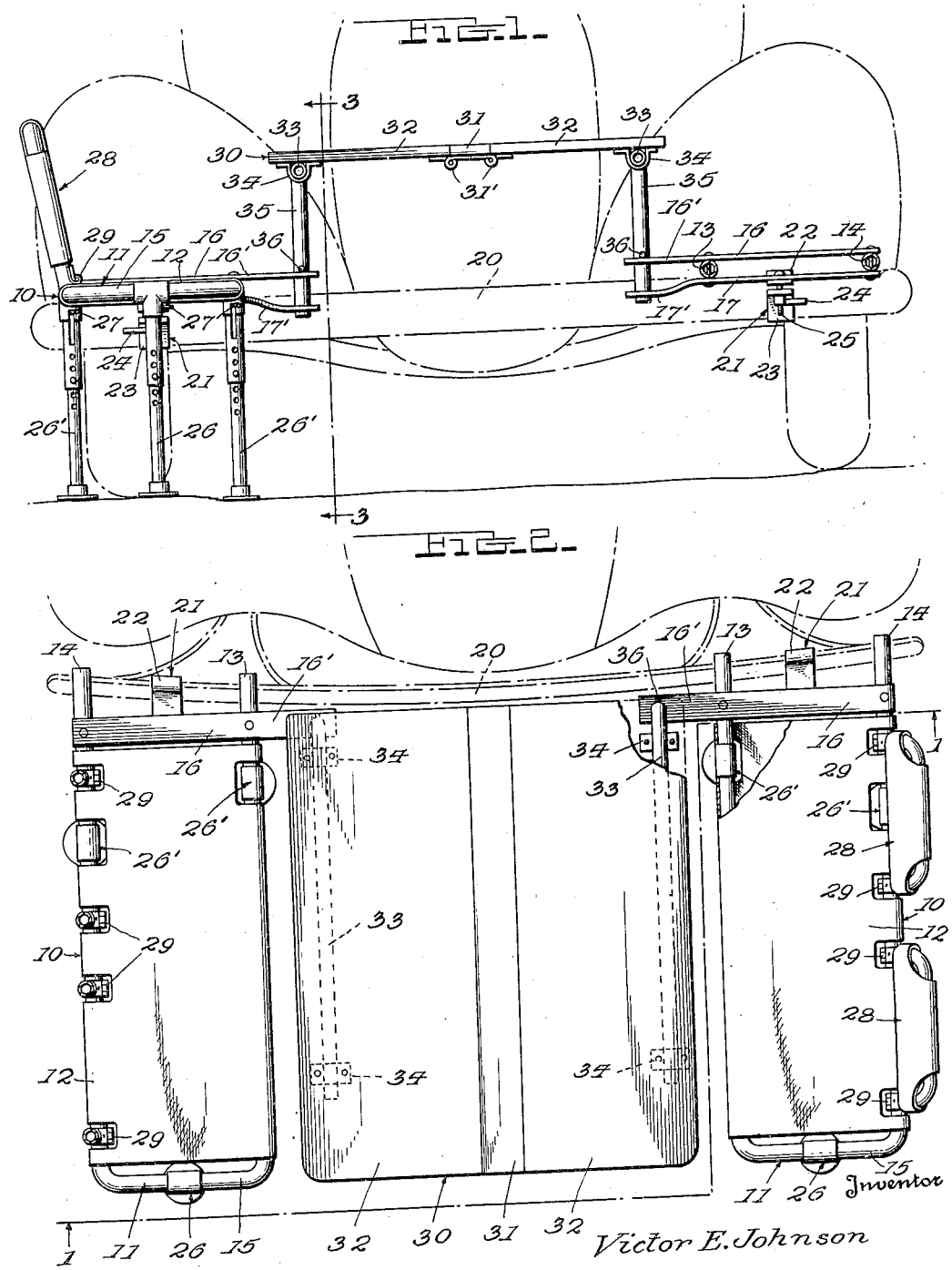
Inventor
Victor E. Johnson
By H.B. Willson & Co. Attorney

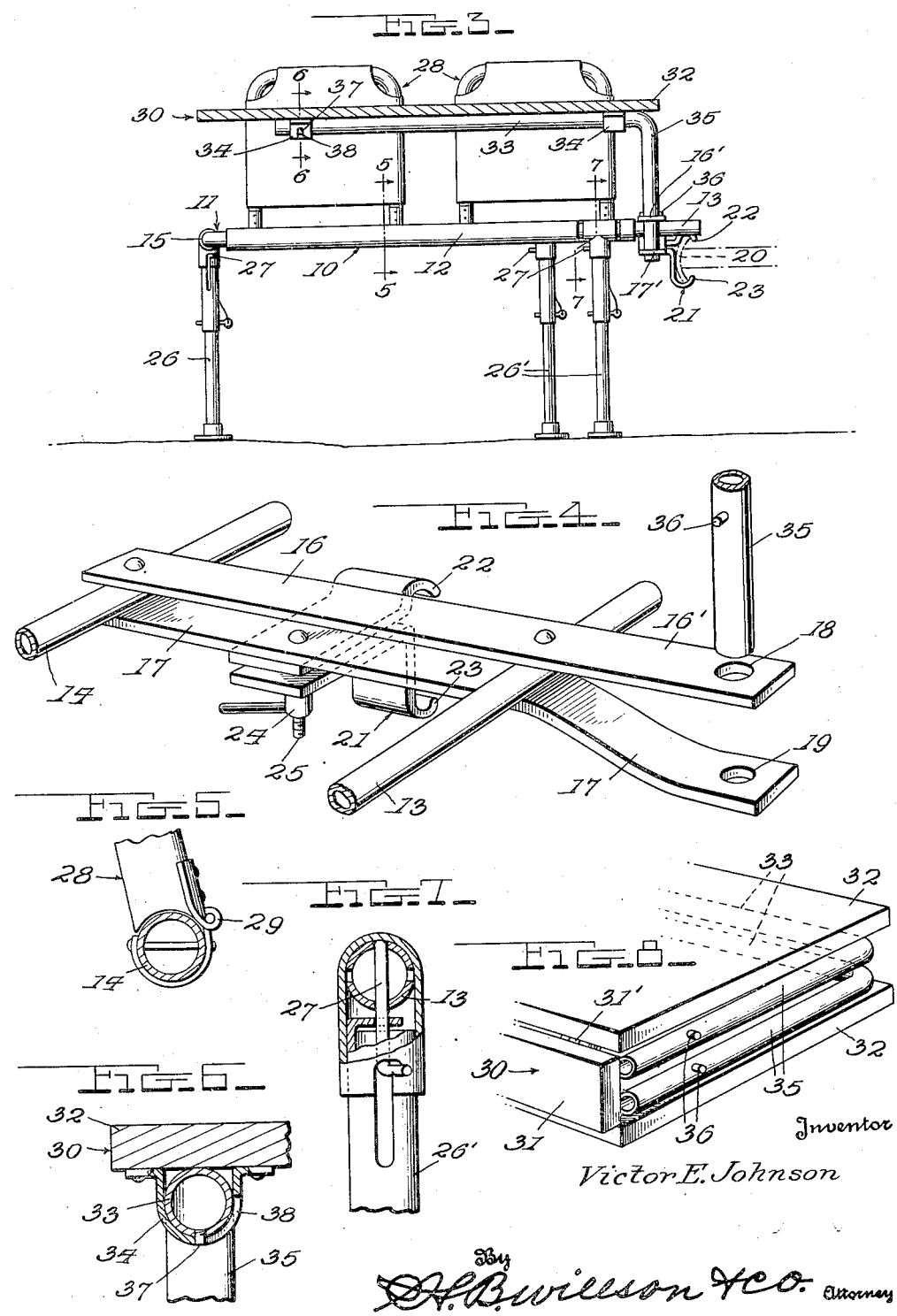

Patented Feb. 7, 1950

2,497,001

UNITED STATES PATENT OFFICE 2,497,001

COMBINATION FURNITURE

Victor E. Johnson, Royal Oak, Mich., assignor to Ross Cowsert, Royal Oak, Mich.

Application February 21, 1946, Serial No. 649,174

1 Claim. (Cl. 155—123)

The invention relates to a table combined with seats, and is intended primarily for outdoor use by tourists, campers, "picknickers," and others who wish to avail themselves of such conveniences.

One object of the invention is to provide a simple and inexpensive construction which may be compactly folded for carrying or storage and may be quickly and easily set up for use whenever desired.

Another object of the invention is to provide a novel and advantageous construction whereby the seats detachably support the table in convenient position for use.

A further and important object is to provide a novel construction well adapted for temporary connection with either the front or rear bumper of an automobile, utilizing the bumper not only to support one end of the structure but to effectively stabilize the entire device.

Figure 1 is an end elevation partly in section as indicated by line 1—1 of Fig. 2, the front end of an automobile with which the invention is connected, being shown in broken lines.

Fig. 2 is a top plan view partly broken away and in section, and again showing the front end of the automobile in broken lines.

Fig. 3 is a vertical sectional view on line 3—3 of Fig. 1.

Fig. 4 is a fragmentary perspective view showing the inner end of one of the seat frames, the clamp for connecting it with an automobile bumper, and a portion of one of the table legs.

Figs. 5, 6 and 7 are detail vertical sectional views on the correspondingly numbered lines of Fig. 3.

Fig. 8 is a detail perspective view showing the manner in which the table is compactly foldable.

The drawings may be considered as disclosing a preferred construction and while that construction will be specifically described, attention is invited to the possibility of making variations within the scope of the invention.

Two seats 10 are provided in opposed relation with each other, each of said seats preferably having a metal frame 11 and a covering or seat proper 12 of canvas or the like. Each seat frame 11 includes a front bar 13, a rear bar 14, and a transverse bar 15 integrally connecting the outer ends of said front and rear bars 13 and 14. The inner ends of the bars 13 and 14 project beyond one end of the covering or seat proper 12, and said projecting ends are connected by upper and lower transverse bars 16 and 17 riveted or otherwise secured thereto, said bars 16 and 17 projecting beyond the front bar 13 as shown at 16' and 17' respectively, and having vertically alined openings 18 and 19 (Fig. 4) in these projecting ends, providing said bars with upwardly open sockets for a purpose to appear. The inner terminals of the bars 13 and 14 are intended to rest upon an automobile bumper 20, and a suitable clamp 21 is secured to each of the lower bars 17 between said bars 13 and 14 to engage said bumper, each clamp having suitable upper and lower jaws 22 and 23 movable into clamping engagement with the bumper by means of a lever nut 24 on a clamping bolt 25. By thus clamping the inner ends of the two frames 11 to the bumper 20 said inner ends are effectively supported. Suitable extensible and retractible, foldable legs 26 are provided to support the outer ends of the frames 11, and it is preferable also to provide the inner end portions of the bars 13 and 14 with similar legs 26' in order that the seats may be used disconnected from the car bumper, if desired. Suitable latches 27 (see more particularly Fig. 7) are provided to hold the legs 26 and 26' either in downwardly projecting operative position, or in upwardly folded position, as desired.

Each seat 10 is preferably provided with hinged downwardly foldable backs 28 preferably formed from arched pieces of metal tubing covered with canvas or the like. The manner of hinging the backs 28 to the seat frames is shown more particularly in Fig. 5 and it will be observevd that the structure is well braced when erected for use, and is readily foldable downwardly when not in use. In this view and others, 29 denotes the hinge.

A table top 30 is positioned for convenient use by the occupants of the seats 10, said top consisting of a relatively narrow central section 31 and two much wider side sections 32 hinged at 31' to said central section 31, permitting the top to be folded as seen in Fig. 8, when not in use. Two longitudinal shafts 33 underlie the outer edge portions of the top sections 32 and are rotatably connected therewith, in parallel relation with each other, by appropriate bearings 34. The inner ends of these shafts 33 are provided with rigid downwardly projecting legs 35 which are preferably integral therewith, the lower ends of said legs being removably received in the sockets formed by the bar ends 16' and 17', and their openings 18 and 19. The legs 35 have appropriate stops 36 to limit their downward movement into the sockets. It is also preferable to provide each shaft 33 with a stop pin 37 operable in a slot 38 of one of its bearings 34 (see Figs. 3 and 6).

When the shaft 33 occupies its normal position, with the leg 35 projecting downwardly, the stop 37 abuts the outer end of the slot 38 and thus assists in stabilizing or bracing the table top 30. When the top is removed, however, the legs 35 may be swung inwardly as seen in Fig. 8 to occupy positions between the table top sections 32.

From the foregoing, taken in connection with the accompanying drawings, it will be seen that novel and advantageous construction has been provided for carrying out the objects of the invention. The table top 30 is readily removable from the seats 10, simply by lifting it, and said table top and its legs may then be compactly folded as seen in Fig. 8. The two seats may be easily disconnected from the bumper 20 and their legs folded into compact positions, and thus the entire structure may be carried in small space, for instance in the trunk of the average car. Moreover, the equipment may be set up for use with speed and ease and will be effectively stabilized, as well as supported to a large extent, by the car bumper.

Excellent results may be attained from the structure shown and described and while it may be considered as preferred, attention is again invited to the possibility of making variations within the scope of the invention.

What is claimed is:

In combination furniture, a seat; a supporting frame for said seat comprising a front bar and a rear bar having free ends projecting beyond one end of said seat, an upper transverse bar secured to the upper sides of said projecting bar ends, and a lower transverse bar secured to the lower sides of said projecting bar ends, said upper and lower transverse bars having free front ends projecting forwardly beyond said front bar, said forwardly projecting bar ends having vertically alined openings to receive a table-supporting leg, at least one of said forwardly projecting bar ends being offset vertically to space it from the other of these bar ends a distance considerably greater than the vertical dimension of said front bar; and supporting means for said seat frame including a clamp secured to at least one of said transverse bars and located between said projecting ends of said front and rear bars, said clamp being constructed to engage an automobile bumper when said projecting ends of said front and rear bars are placed upon the latter.

VICTOR E. JOHNSON.

REFERENCES CITED

The following references are of record in the file of this patent:

UNITED STATES PATENTS

| Number | Name | Date |
|---|---|---|
| 355,230 | Taliaferro | Dec. 28, 1886 |
| 366,525 | Taliaferro | July 12, 1887 |
| 491,590 | Poulson | Feb. 14, 1893 |
| 1,213,299 | Thum | Jan. 23, 1917 |
| 1,241,449 | Sundquist | Sept. 25, 1917 |
| 1,477,812 | Crockett | Dec. 18, 1923 |
| 1,516,795 | Schwarting | Nov. 25, 1924 |
| 1,723,238 | Hoot | Aug. 6, 1929 |
| 1,841,282 | Fain | Jan. 12, 1932 |
| 1,952,737 | Vaghi | Mar. 27, 1934 |
| 2,160,958 | Critchlow | June 6, 1939 |
| 2,203,320 | Anderson | June 4, 1940 |

Certificate of Correction

Patent No. 2,497,001 February 7, 1950

VICTOR E. JOHNSON

It is hereby certified that the above numbered patent was erroneously issued to "Ross Cowsert" as assignee of the entire interest therein, whereas said patent should have been issued to *Victor E. Johnson, of Royal Oak, Michigan, assignor of 40% to Ross Cowsert, of Royal Oak, Michigan;* and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*